US 6,725,154 B2

(12) United States Patent
Kamikawa et al.

(10) Patent No.: US 6,725,154 B2
(45) Date of Patent: Apr. 20, 2004

(54) IMAGE DISPLAY APPARATUS

(75) Inventors: Noriyuki Kamikawa, Hyogo (JP); Takashi Ota, Hyogo (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/442,052

(22) Filed: May 21, 2003

(65) Prior Publication Data

US 2003/0227469 A1 Dec. 11, 2003

(30) Foreign Application Priority Data

Jun. 7, 2002 (JP) .......................... 2002-166512

(51) Int. Cl.$^7$ ............................................. G01C 21/00
(52) U.S. Cl. .................... 701/208; 701/200; 701/211; 701/212; 73/178 R; 340/995.14; 340/995.15
(58) Field of Search ................. 701/208, 200, 701/211, 212, 23, 28; 73/178 R; 340/990, 995.1, 995.11, 995.14, 995.15, 995.19

(56) References Cited

U.S. PATENT DOCUMENTS 6,064,322 A * 5/2000 Ohira .................... 340/995.18
6,157,342 A * 12/2000 Okude et al. ............ 342/357.13
6,453,234 B1 * 9/2002 Noguchi et al. ............. 701/208
6,477,526 B2 * 11/2002 Hayashi et al. ................ 707/4

FOREIGN PATENT DOCUMENTS

| JP | A 1-163608 | 6/1989 |
| JP | A 5-113343 | 5/1993 |
| JP | A 5-165402 | 7/1993 |

* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

An image display apparatus includes display control means for displaying a map image and a real image on a display screen on the same scale concerning the same region based on map data and real image data. The display control means has a function of superposing on either of the map image and the real image as a background, the other image in a predetermined area and combining the images so that only the other image is seen in the superposition area.

9 Claims, 7 Drawing Sheets

IMAGE DISPLAY APPARATUS

The present disclosure relates to the subject matter contained in Japanese Patent Application No. 2002-166512 filed on Jun. 7, 2002, which is incorporated herein by reference in its entirety.

BACKGROUND OF THE INVENTION

1. Field of the Invention

This invention relates to an image display apparatus and more particularly to an image display apparatus which is adopted for a navigation system and uses real image data corresponding to an image such as a satellite photograph or an aerial photograph of the earth's surface.

2. Description of the Related Art

A navigation system in a related art can display a map on a screen of a display based on road map data recorded on a DVD-ROM, etc., and further can display the current position on the map and guide the user through the route to the destination based on the position data of the navigation system.

However, since the navigation system in the related art uses the map data to prepare the displayed map image, it is difficult for the user to understand the current position through the map image and grasp the actual circumstances surrounding the current position; this is a problem.

This problem is caused by the fact that the map image is hard to represent the up and down positional relationship of overpass and underpass roads, etc., and that, in fact, a large number of roads, buildings, etc., are not displayed on the map image.

As one of means for solving such a problem, an art of displaying the current position on an aerial photograph image prepared from aerial photograph data is disclosed (JP-A-5-113343). To use the aerial photograph image, a building, etc., as a landmark becomes very easy to understand, thus making it possible for the user to easily understand the current position and also easily grasp the actual circumstances surrounding the current position.

However, the aerial photograph image prepared using aerial photograph data does not always make it possible for the user to more easily understand the current position and more easily grasp the actual circumstances surrounding the current position than the map image prepared using map data; the map image may make it possible for the user to more easily understand the current position than the aerial photograph image.

Therefore, it seems that a navigation system using both an aerial photograph image and a map image rather than a navigation system using only an aerial photograph image or a navigation system using only a map image will be mainstream as a next-generation navigation system. Thus, in the future, it will become important to properly use a real image such as an aerial photograph image and a map image having different features.

SUMMARY OF THE INVENTION

It is therefore an object of the invention to provide an image display apparatus which is adopted particularly for a navigation system and can properly use both a real image such as an aerial photograph image and a map image prepared using map data to enhance the user satisfaction.

To the end, according to the invention, according to a first aspect of the invention, an image display apparatus includes a display screen and a display control unit. The display control unit displays a map image and a real image on the display screen on the same scale concerning the same region based on map data and real image data. The display control unit displays one of the map image and the real image as a background. The display control unit combines the map image and the real image in a predetermined region so that only the other is displayed in the predetermined region.

In the first aspect, the one of the map image and the real image (for example, satellite photograph, aerial photograph, etc.,) is displayed as the background and the other is superposed thereon in the predetermined area on the same scale. Furthermore, the images are combined so that only the other is seen in the predetermined region.

For example, when the map image is displayed as the background, in the predetermined area, the composite coefficient of the map image is set to 0 and that of the real image is set to 1 for combining the images, so that only the real image is seen in the predetermined area. Consequently, only the real image is incorporated into a part of the map image, which is displayed as the background on the display screen, so that it is made possible to capture a target, etc., from many other angles.

According to a second aspect of the invention, an image display apparatus includes a display screen and a display control unit which displays a map image and a real image, which have the same scale and show the same area, on the display screen on the basis of map data and real image data. The display control unit displays one of the map image and the real image as a background, combines the map image and the real image in a predetermined region so that the other is seen through the one in at least a part of the predetermined region, and displays the combined image in the predetermined region.

In the second aspect, the one of the map image and the real image. (for example, satellite photograph, aerial photograph, etc.,) is displayed as the background, and the other is superposed in the predetermined area on the same scale. For example, when the map image is displayed as the background, the real image is superposed on a part of the map image, so that it is made possible to capture a target, etc., from many other angles.

Further, in the second aspect, for at least a part of the predetermined region in which the images are superposed on each other, the images are combined so that from under the one of the images, the other becomes transparent.

For example, when the map image is displayed as the background, in the predetermined region, the composite coefficient of the map image is set to $\alpha$ ($0 \leq \alpha < 1$) and that of the real image is set to $\beta$ ($=1-\alpha$) for combining the images, and the map image becomes transparent from under (all or a part of) the real image in the predetermined region. Thus, a very large number of pieces of information can be provided for the user.

According to a third aspect of the invention, in the first aspect, the image display apparatus further includes a composite degree setting unit which sets a composite degree of the map image and the real image. The display control unit combines the map image and the real image on the basis of the composite degree.

In the third aspect, the composite degree can be set, so that the user can make adjustment so as to raise the display luminance of the map image (lower the display luminance of the real image) or raise the display luminance of the real image (lower the display luminance of the map image) in the predetermined region in which the images are superposed as desired. Therefore, a display state responsive to the user's preference can be realized.

According to a fourth aspect of the invention, in any one of the second and third aspects, the display control unit combines the map image and the real image so that luminance value of the combined image increases as approaching to a boundary of the predetermined region.

In the fourth aspect, the images are combined so as to raise the display luminance of the background image as approaching the outside of the superposition area from the superposition region, so that image transition from the superposition region to the outside of the superposition region can be made smooth.

According to a fifth aspect of the invention, a navigation apparatus provide a user with information required reaching a destination to guide the user to the destination. The navigation apparatus includes a display screen and an image display device. The image display device includes a display screen and a display control unit which displays a map image and a real image, which have the same scale and show the same area, on the display screen on the basis of map data and real image data. The display control unit displays one of the map image and the real image as a background. The display control unit combines the map image and the real image in a predetermined region so that the other is seen through the one in at least a part of the predetermined region. The display control unit displays the combined image in the predetermined region.

According to a sixth aspect of the invention, in the fifth aspect, the predetermined region is one of a peripheral region of a current position of a vehicle obtained on the basis of current position information, a peripheral region of a predetermined facility obtained on the basis of predetermined facility position information, and a peripheral region of a predetermined position obtained on the basis of predetermined position information specified by the user.

In the sixth aspect, the predetermined area is any of the region surrounding the current position, the region surrounding the destination, the region surrounding the predetermined facility (for example, a station), or the region surrounding the predetermined position previously specified by the user (for example, home position). Thus, for example, when the map image is displayed as the background, the real image is displayed in the region.

Therefore, an image having different quality from the background image is displayed in the attention region, so that the attention region and any other portion can be discriminated from each other.

According to a seventh aspect of the invention, in the fifth aspect, the predetermined region is one of an upper half of the display screen and a lower half of the display screen.

In the seventh aspect, the predetermined area is the approximately upper half area or the approximately lower half area of the display screen. Therefore, the map image can be displayed in the approximately upper half area and the real image can be displayed in the approximately lower half area or the real image can be displayed in the approximately upper half area and the map image can be displayed in the approximately lower half area.

In the navigation system, often the area surrounding the current position is displayed in the lower portion of the display screen and a location at a large distance from the current position is displayed in the upper portion of the display screen. Thus, in the seventh aspect, an image on a nearby side and an image on a distant side can be discriminated from each other with the current position as the reference.

According to an eighth aspect of the invention, in the fifth aspect, the predetermined region is a peripheral region of a route for the destination obtained on the basis of route information.

In the eighth aspect, the predetermined region is the region surrounding the route. Thus, for example, when the map image is displayed as the background, the real image is displayed in the region surrounding the route.

Therefore, an image having different quality from the background image is displayed in the region surrounding the route, so that the region surrounding the route and any other portion can be discriminated from each other.

DETAILED DESCRIPTION OF THE PREFERRED EMBODIMENTS

Figure 1:
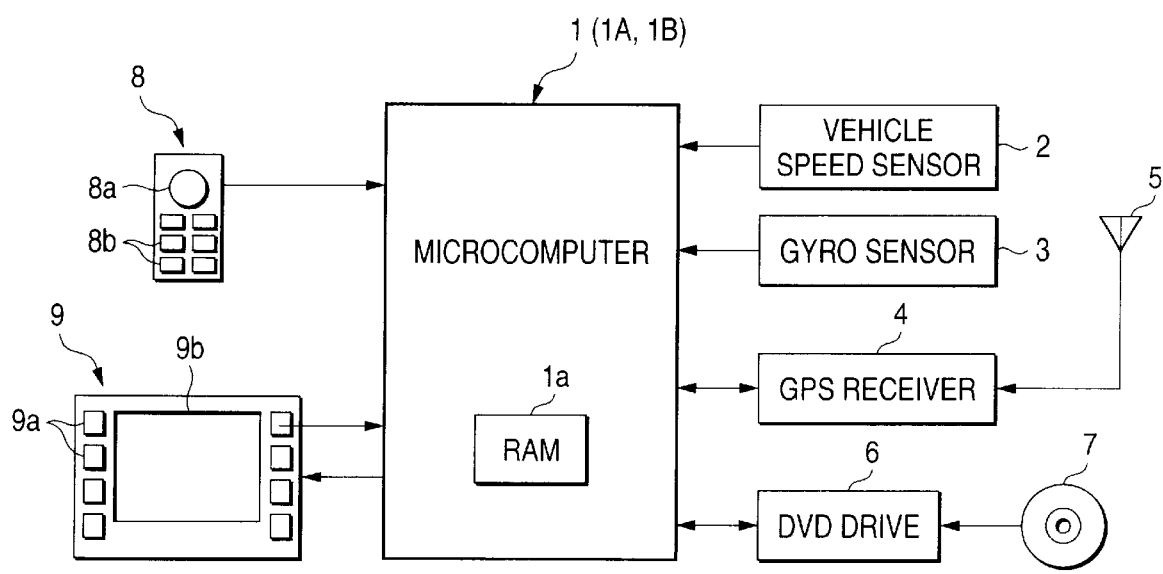
FIG. 1 is a block diagram to schematically show the main part of a navigation system adopting an image display apparatus according to a first embodiment of the invention.

Referring now to the accompanying drawings, there are shown preferred embodiments of an image display apparatus according to the invention. FIG. 1 is a block diagram to schematically show the main part of a navigation system adopting an image display apparatus according to a first embodiment.

A vehicle speed sensor 2 for calculating the vehicle speed to acquire information concerning the traveled distance (mileage) and a gyro sensor 3 for acquiring information concerning the traveling direction are connected to a microcomputer 1. The microcomputer 1 can estimate the position of the vehicle installing the navigation system (image display apparatus) based on the calculated traveled distance information and traveling direction information (self-contained navigation).

A GPS receiver 4 receives a GSP signal from a satellite through an antenna 5 and is connected to the microcomputer 1. The microcomputer 1 can estimate the position of the vehicle installing the navigation system based on the GPS signal (GPS navigation).

A DVD drive 6 capable of inputting map data, real image data, etc., from a DVD-ROM 7 (any other storage unit is also possible) recording map data and real image data of a satellite photograph of the earth's surface is also connected to the microcomputer 1. The microcomputer 1 stores necessary map data and real image data from the DVD-ROM 7 in RAM 1a of the microcomputer 1 based on the estimated current vehicle position information, route information concerning a guide route described later, and the like. To relate the real image data to position coordinates, a method of using latitudes and longitudes of the upper left corner and the lower right corner of a rectangular area represented by the real image data can be named.

The microcomputer 1 can perform map matching processing of matching the estimated current vehicle position and the map data (real image data), thereby displaying a map image (real image) precisely indicating the current vehicle position on a display panel 9b.

Switch signals output from a joystick 8a and button switches 8b placed on a remote control 8 and switch signals output from button switches 9a placed on a display 9 are input to the microcomputer 1. Then, the microcomputer 1 performs processing responsive to the switch signals. For example, when the microcomputer 1 reads information concerning a destination, a point via which the vehicle will go to the destination, etc., the microcomputer 1 finds an optimum route from the current vehicle position (starting place) to the destination via the point and displays the optimum route as a guide route on the display panel 9b together with the map image.

A plurality of infrared LEDs and a plurality of phototransistors are placed facing each other at the top and bottom and left and right of the display panel 9b and can detect a position at which user touches the display panel 9b, and the microcomputer 1 can acquire the detection result.

Figure 2:
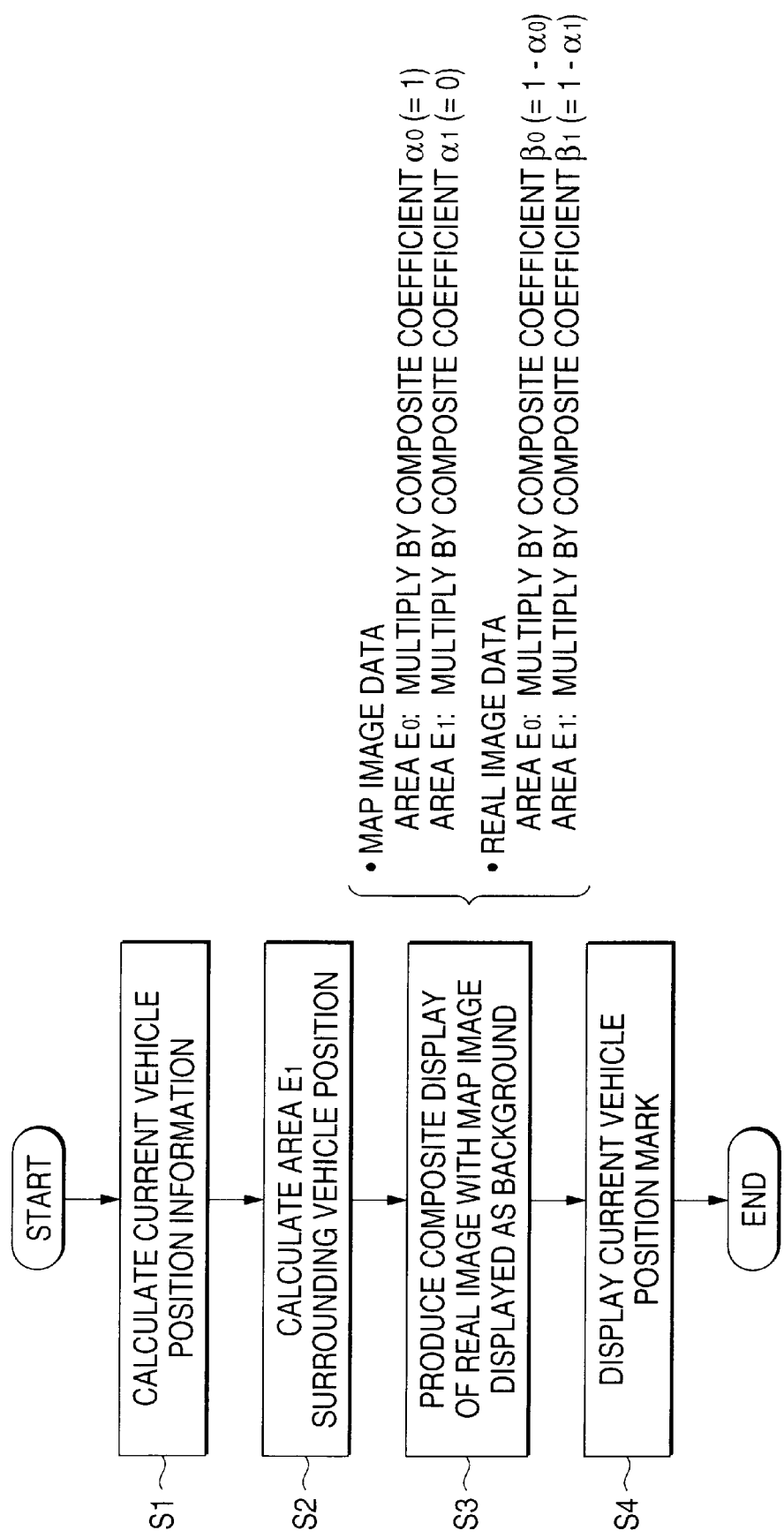
FIG. 2 is a flowchart to show processing operation performed by a microcomputer in the navigation system adopting the image display apparatus according to the first embodiment of the invention.

Next, processing operation (1) performed by the microcomputer 1 in the navigation system adopting the image display apparatus according to the first embodiment will be discussed based on a flowchart of FIG. 2. First, the current vehicle position is calculated from a GPS signal and the like (step S1). An area $E_1$ surrounding the current vehicle position, for example, an area with a radius of several hundred meters with the current vehicle position as a center is calculated based on the calculated current vehicle position information (step S2). Specifically, the radius may be 100 meters, 200 meters, 500 meters, or 1,000 meters. Alternatively, the user may be allowed to specify the radius desirably through the remote controller 8 or the display 9. Also, the radius may be changed in response to the scale of a displayed map image. Next, on the basis of the map data and the real image data stored in the RAM 1a, a map image is displayed as a background in the region containing the current vehicle position on the display panel 9b and a real image is displayed in the area $E_1$ on the same scale as the map image (step S3). Then, a mark M indicating the current vehicle position is displayed on the display panel 9b (step S4).

Here, the processing operation at step S3 will be discussed in more detail. The microcomputer 1 displays the map image on the display panel 9b based on the formula (1).

$$\text{(the displayed map data)} = \text{(the map data in an area } E_0) \times \alpha_0 + \text{(the map data in the area } E_1) \times \alpha_1 \quad (1)$$

Also, the microcomputer 1 displays the real image on the display panel 9b based on the formula (2).

$$\text{(the displayed real image data)} = \text{(the real image data in the area } E_0) \times \beta_0 + \text{(the real image data in the area } E_1) \times \beta_1 \quad (2)$$

$$\beta_0 = 1 - \alpha_0 \quad (3)$$

$$\beta_1 = 1 - \alpha_1 \quad (4)$$

Here, the area $E_0$ represents the remaining area other than the area $E_1$. In the formulae (1) and (2), the map data and the real image data, which are to be calculated, may be pixel values luminance values, or the like.

In the processing operation (1), to display the map image corresponding to the map data in the area $E_0$, the microcomputer 1 multiplies the map data by the composite coefficient $\alpha_0 = 1$; on the other hand, with regard to the area $E_1$, the microcomputer 1 multiplies the map data by a composite coefficient $\alpha_1 = 0$.

When the microcomputer 1 displays the real image corresponding to the real image data in the area $E_0$, the microcomputer 1 multiplies the real image data by a composite coefficient $\beta_0$ (=$1-\alpha_0$, namely, 0). That is, the real image data is not displayed in the area $E_0$; on the other hand, when the microcomputer 1 displays the real image in the area $E_1$, the microcomputer 1 multiplies the real image data by a composite coefficient $\beta_1$ (=$1-\alpha_1$, namely, 1).

Figure 3:
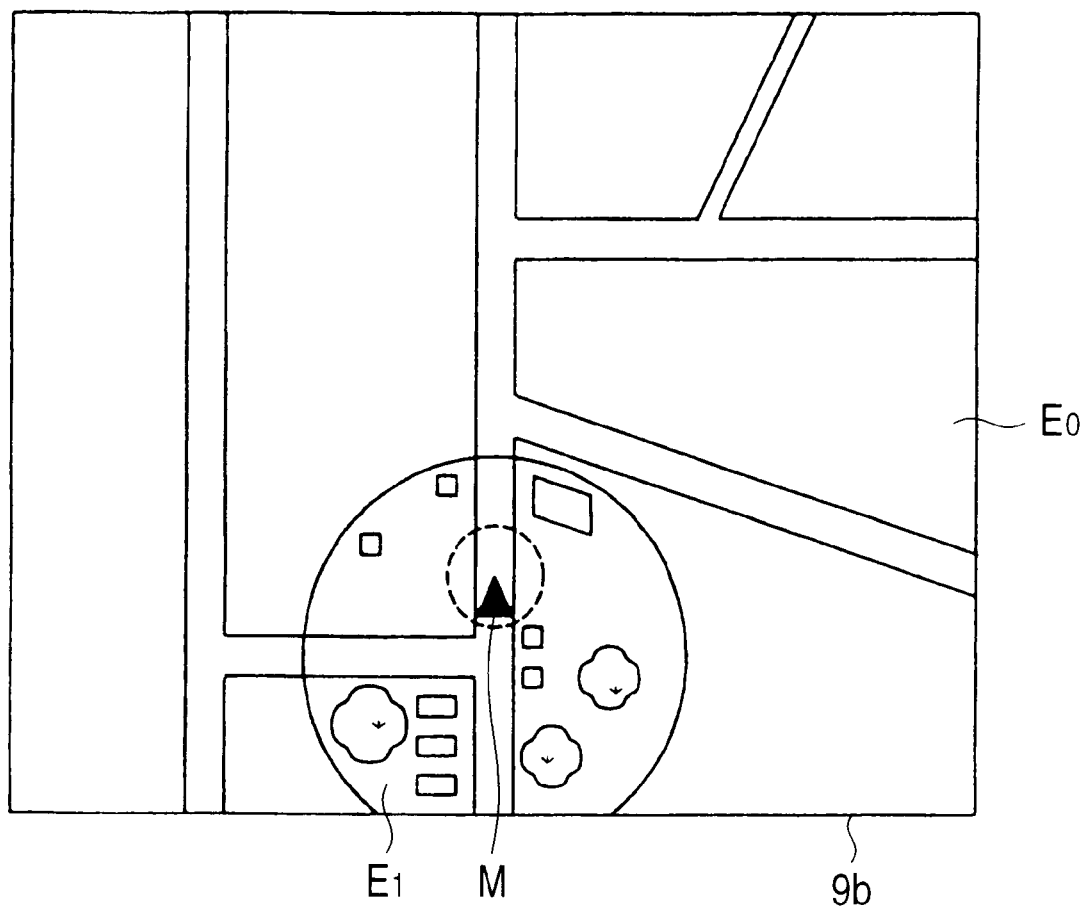
FIG. 3 is a drawing to show an example of a screen displayed on a display panel of the navigation system adopting the image display apparatus according to the first embodiment of the invention.

Accordingly, since the composite coefficient $\alpha_0$ is 1 (the composite coefficient $\beta_0$ is 0), only the map image is displayed in the area $E_0$. Since the composite coefficient $\alpha_1$ is 0 (the composite coefficient $\beta_1$ is 1), only the real image is displayed in the area $E_1$. FIG. 3 shows a state in which the map image is displayed in the area $E_0$ and the real image is displayed in the area $E_1$.

According to the navigation system adopting the image display apparatus of the first embodiment, only the real image (for example, satellite photograph, aerial photograph, etc.,) is incorporated into the area $E_1$ surrounding the current vehicle position on the display on the same scale as the map image, which is displayed as the background. Therefore, it is made possible to capture a target, etc., from many other angles.

Next, a navigation system adopting an image display apparatus according to a second embodiment of the invention will be discussed. The navigation system has the same configuration as the navigation system previously described with reference to FIG. 1 except for microcomputer 1. Therefore, the microcomputer is denoted by a different reference numeral 1A and other components will not be discussed again.

Figure 4:
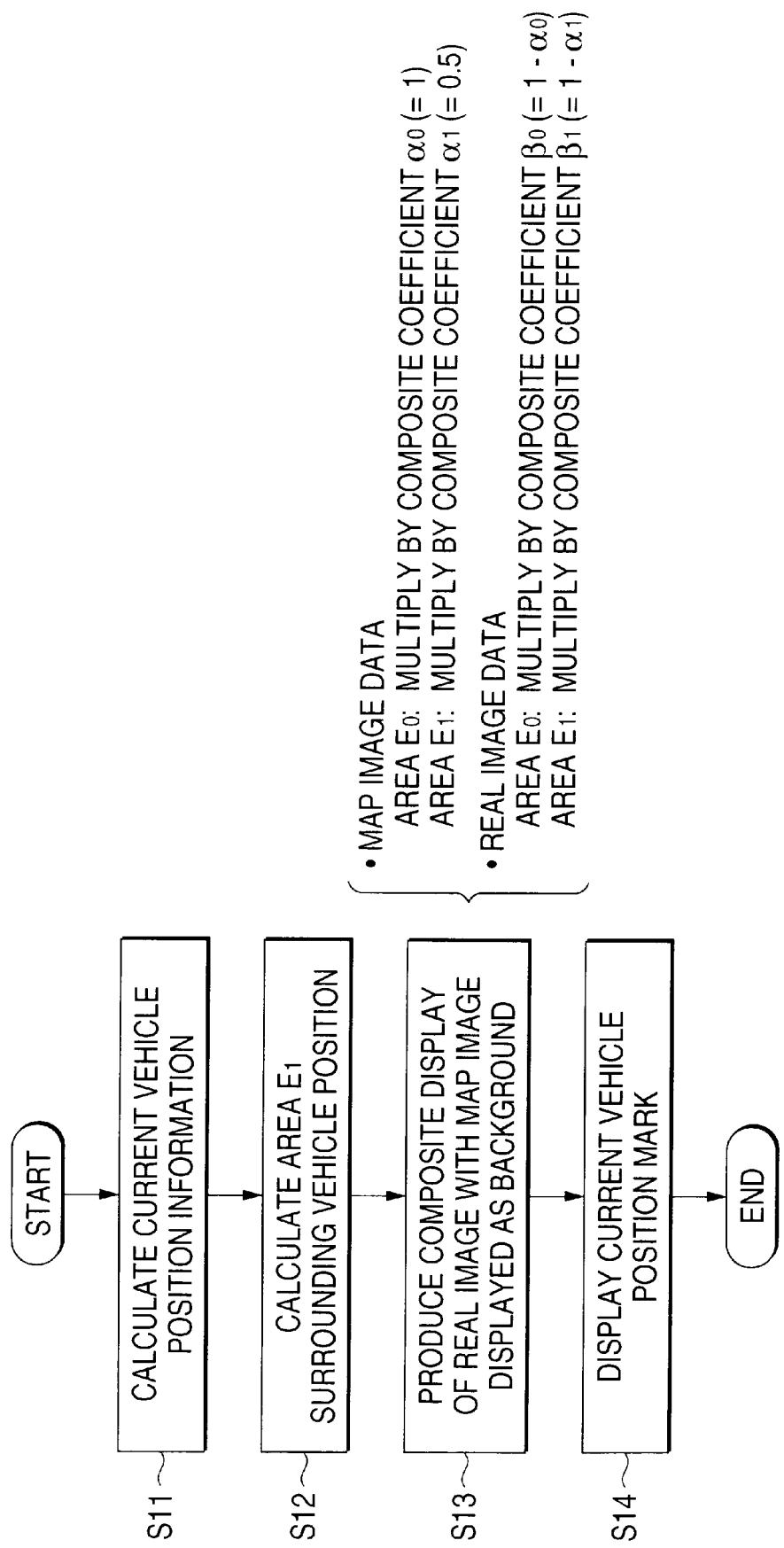
FIG. 4 is a flowchart to show processing operation performed by a microcomputer in a navigation system adopting an image display apparatus according to a second embodiment of the invention.

Processing operation (2) performed by the microcomputer 1A in the navigation system adopting the image display apparatus according to the second embodiment will be discussed based on a flowchart of FIG. 4. First, the current vehicle position is calculated from the GPS signal, etc., (step S11). The area $E_1$ surrounding the current vehicle position, for example, an area with the radius of several hundred meters with the current vehicle position as the center is calculated based on the calculated current vehicle position information (step S12). The radius may be determined in the same way as the first embodiment. Next, on the basis of the map data and the real image data stored in the RAM 1a, a map image is displayed as a background in the region containing the current vehicle position on the display panel 9b and a real image is displayed in the area $E_1$ on the same scale as the map image (step S13). Then a mark M indicating the current vehicle position is displayed on the display panel 9b (step S14).

Here, the processing operation at step S13 will be discussed in more detail. The microcomputer 1A displays the map image and the real image on the display 9 based on the formulae (1)–(4). When the microcomputer 1A displays the map image corresponding to the map data in the remaining area $E_0$, the microcomputer 1A multiplies the map data by a composite coefficient $\alpha_0 = 1$; on the other hand, when the microcomputer 1A displays the map image in the area $E_1$, the microcomputer 1A multiplies the map data by a composite coefficient $\alpha_1$ (0 $\leq \alpha_1 \leq$ 1, for example, 0.5).

When the microcomputer displays the real image corresponding to the real image data in the area $E_0$, the microcomputer 1A multiplies the real image data by a composite coefficient $\beta_0$ (=1-$\alpha_0$, namely, 0). That is, the real image is not displayed in the area $E_0$. On the other hand, when the microcomputer 1A displays the real image in the area $E_1$, the microcomputer 1A multiplies the real image data by a composite coefficient $\beta_1$ (=1-$\alpha_1$, for example, 0.5).

Accordingly, since the composite coefficient $\alpha_0$ is 1 (the composite coefficient $\beta_0$ is 0), only the map image is displayed in the area $E_0$. Since the composite coefficient $\alpha_1$ is 0.5 (the composite coefficient $\beta_1$ is 0.5), display is produced in the area $E_1$ so that the map image becomes transparent from under the real image.

According to the navigation system adopting the image display apparatus of the second embodiment, the real image (for example, satellite photograph, aerial photograph, etc.,) is superposed in the area $E_1$ surrounding the current vehicle position on the display on the same scale as the map image, which is displayed as the background. Therefore, it is made possible to capture a target, etc., from many other angles.

Further, the images are combined so that the map image becomes transparent from under the real image. Thus, a very large number of pieces of information can be provided for the user.

In the image display apparatus according to the second embodiment, to display an image in the area $E_1$, the map data is multiplied by the composite coefficient $\alpha_1$ (0.5), the real image data is multiplied by the composite coefficient $\beta_1$ (=1-$\alpha_1$), and the composite image is displayed in the area $E_1$. However, in an image display apparatus according to another embodiment, the composite coefficient $\alpha_1$ may be varied in the area $E_1$.

For example, the composite coefficient $\alpha_1$ is set to 0 (the composite coefficient $\beta_1$ is set to 1) in the center of the area $E_1$ and as approaching the boundary between the area $E_1$ and the area $E_0$, the composite coefficient $\alpha_1$ is increased and becomes 1 just on the boundary. Whereby image transition from the real image to the map image can be made smooth.

Figure 5:
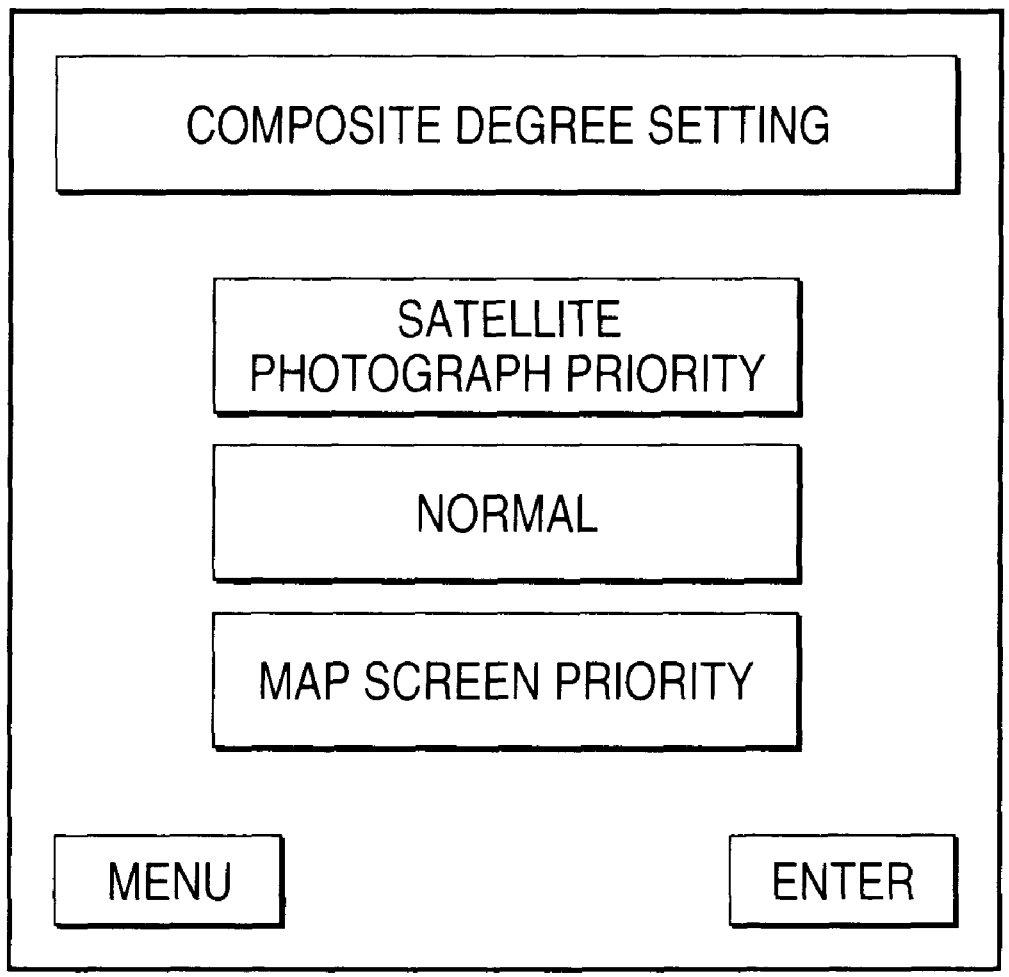
FIG. 5 is a drawing to show an operation screen displayed on a display panel of a navigation system adopting an image display apparatus according to a different embodiment of the invention.

According to a navigation system adopting an image display apparatus of still another embodiment, the user may be made able to conduct various settings through a screen displayed on a display panel 9b. For example, the user may be allowed to set through a COMPOSITE DEGREE SETTING screen as shown in FIG. 5 the composite coefficient $\alpha_1$, namely, a coefficient determining the transparency of a map image relative to a real image as desired. The microcomputer 1A combines the images based on the setup contents through the COMPOSITE DEGREE SETTING screen, so that a display state responsive to the user's preference can be realized.

For example, if the user selects SATELLITE PHOTOGRAPH PRIORITY through the COMPOSITE DEGREE SETTING screen (see FIG. 5), the composite coefficient $\alpha_1$ is set to 0.3 for combining images; if the user selects NORMAL, the composite coefficient $\alpha_1$ is set to 0.5 for combining images; and if the user selects MAP SCREEN PRIORITY, the composite coefficient $\alpha_1$ is set to 0.7 for combining images.

In the description of the image display apparatus according to the first or second embodiment, the real image is superposed in the area $E_1$ surrounding the current vehicle position on the display with the map image, which is displayed as the background. However, the map image may be superposed in the area $E_1$ surrounding the current vehicle position on the display with the real image displayed as the background. The user may be made able to switch the display state as desired.

In the image display apparatus according to the first or second embodiment, the real image is superposed in the area $E_1$ surrounding the current vehicle position with the map image displayed as the background. However, in an image display apparatus according to further another embodiment, for example, the real image may be superposed in an area surrounding the destination, an area surrounding a predetermined facility (for example, a station), or an area surrounding a predetermined position previously specified by the user (for example, home position). Furthermore, on the basis of route information concerning a guide route for guiding to the destination, the real image may be displayed in an area surrounding the guide route. For example, the real image is displayed along the guide route with the map image displayed as the background.

Next, a navigation system adopting an image display apparatus according to a third embodiment of the invention will be discussed. The navigation system has the same configuration as the navigation system previously described with reference to FIG. 1 except for microcomputer 1. Therefore, the microcomputer is denoted by a different reference numeral 1B and other components will not be discussed again.

Processing operation (3) performed by the microcomputer 1B in the navigation system adopting the image display apparatus according to the third embodiment will be discussed based on a flowchart of FIG. 6. First, the current vehicle position is calculated from a GPS signal, etc., (step S21). Next, on the basis of the map data and the real image data stored in the RAM 1a, a real image is displayed in an upper area $E_U$ of the display panel 9b and a map image is displayed in a lower area ED of the display panel 9b on the same scale as the real image (step S22). Then, a mark M indicating the current vehicle position is displayed on the display panel 9b (step S23).

Here, the processing operation at step S22 will be discussed in more detail. The microcomputer 1B displays the map image on the display panel 9b based on the formula (5).

$$\text{(the displayed map data)} = \text{(the map data in the area } E_U\text{)} \times \alpha_U + \text{(the map data in the area } E_D\text{)} \times \alpha_D \quad (5)$$

Also, the microcomputer 1 displays the real image on the display panel 9b based on the formula (6).

$$\text{(the displayed real image data)} = \text{(the real image data in the area } E_U\text{)} \times \beta_U + \text{(the real image data in the area } E_D\text{)} \times \beta_D \quad (6)$$

$$\beta_U = 1 - \alpha_U \quad (7)$$

$$\beta_D = 1 - \alpha_D \quad (8)$$

In the formulae (5) and (6), the map data and the real image data, which are to be calculated, maybe pixel values, luminance values, or the like.

When the microcomputer 1B displays the map image corresponding to the map data in the area $E_U$, the microcomputer 1B multiplies the map data by a composite coefficient $\alpha_U$=0. That is, the map image is not displayed in the area $E_U$. On the other hand, when the microcomputer 1B displays the map image in the area $E_D$, the microcomputer 1B multiplies the map data by a composite coefficient $\alpha_D$=1.

Figure 7:
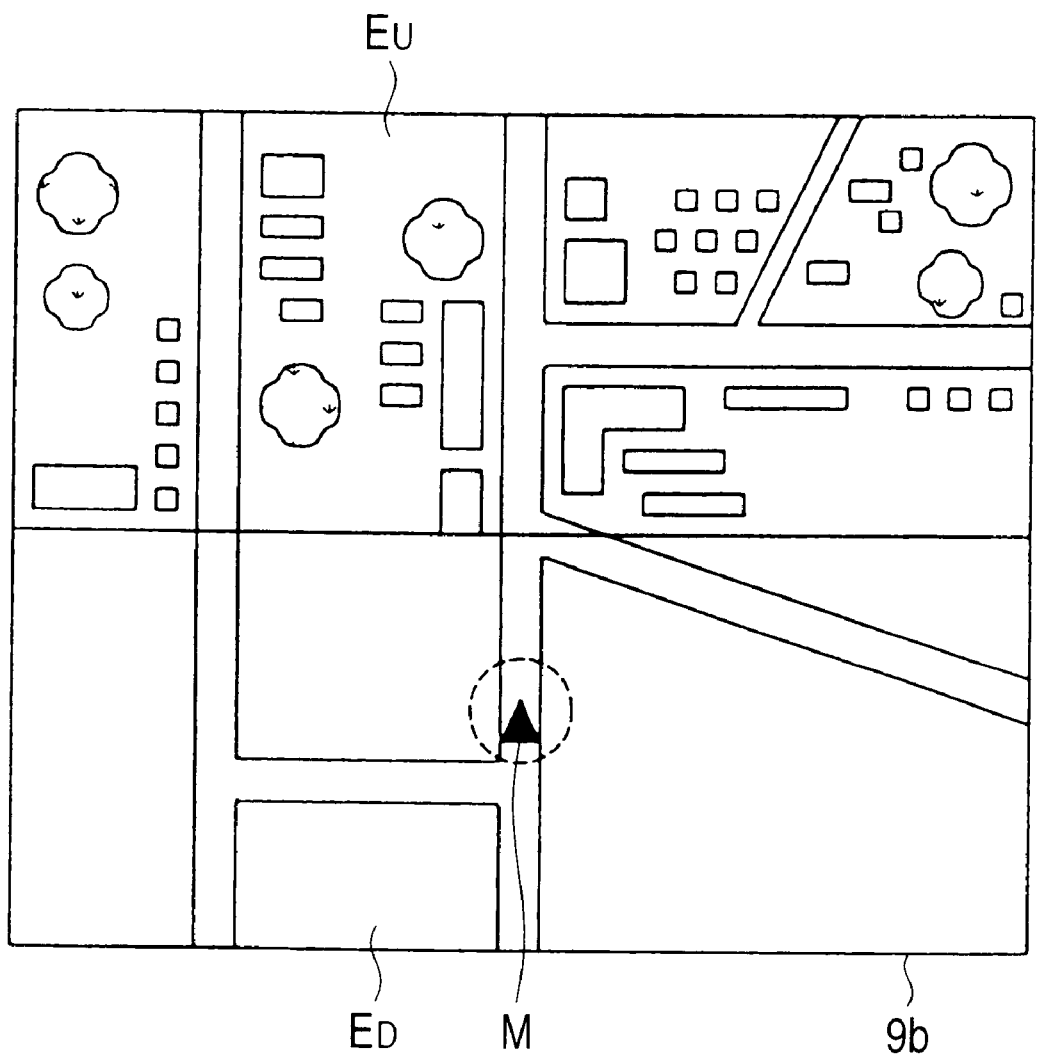
FIG. 7 is a drawing to show an example of a screen displayed on a display panel of the navigation system adopting the image display apparatus according to the third embodiment of the invention.

When the microcomputer 1B displays the real image corresponding to the real image data in the area $E_U$, the microcomputer 1B multiplies the real image data by a composite coefficient $\beta_U$ (=1−$\alpha_U$, namely, 1). On the other hand, when the microcomputer 1B displays the real image in the area $E_D$, the microcomputer 1B multiplies the real image data by a composite coefficient $\beta_D$ (=1−$\alpha_D$, namely, 0). That is, the real image is not displayed in the area $E_D$. FIG. 7 shows a state in which the real image is displayed in the upper area $E_U$ and the map image is displayed in the lower area $E_D$.

According to the navigation system adopting the image display apparatus of the third embodiment, the real image is displayed in the upper area $E_U$ of the display panel 9b and the map image is displayed in the lower area $E_D$ of the display panel 9b.

By the way, in the navigation system, often the area surrounding the current vehicle position is displayed in the lower portion of the display panel 9b and a location at a large distance from the current vehicle position is displayed in the upper portion of the display panel 9b. Thus, the real image is displayed in the area $E_U$ and the map image is displayed in the area $E_D$ as described above (of course, the real image and the map image may be displayed in the area $E_D$ and the area $E_U$ respectively), whereby an image on a nearby side and an image on a distant side can be discriminated from each other with the current vehicle position as the reference.

In the third embodiment, the composite coefficient $\alpha_U$ takes 0. However, the invention is not limited to this. The user may be allowed to set the composite coefficients $\alpha_U$ and $\alpha_D$ through the remote controller 8 or the display 9, desirably.

The images shown in FIGS. 3 and 7 are images of viewing the earth's surface roughly from above (elevation angle $\theta$=90 degrees) (flat images). However, the invention is not limited to images of viewing the earth's surface roughly directly from above and an image of viewing the earth's surface from a slanting direction (0 degrees<elevation angle $\theta$<90 degrees, for example, elevation angle $\theta$=60 degrees) (stereoscopic image) may be displayed on the display panel 9b.

Figure 6:
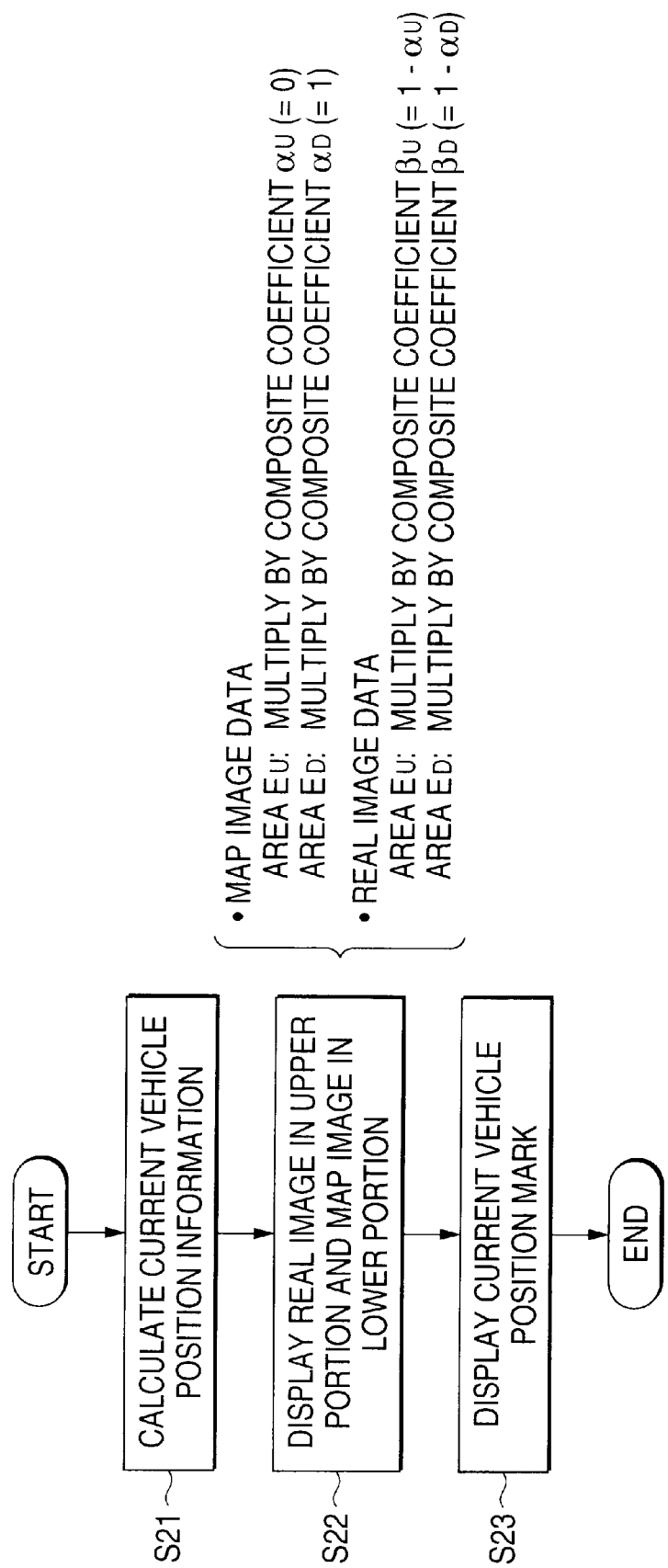
FIG. 6 is a flowchart to show processing operation performed by a microcomputer in a navigation system adopting an image display apparatus according to a third embodiment of the invention.

FIG. 6
S21 CALCULATE CURRENT VEHICLE POSITION INFORMATION
S22 DISPLAY REAL IMAGE IN UPPER PORTION AND MAP IMAGE IN LOWER PORTION
DISPLAY CURRENT VEHICLE POSITION MARK
① MAP IMAGE DATA
   AREA $E_U$: MULTIPLY BY COMPOSITE COEFFICIENT $\alpha_U$ (=0)
   AREA $E_D$: MULTIPLY BY COMPOSITE COEFFICIENT $\alpha_D$ (=1)
② REAL IMAGE DATA
   AREA $E_U$: MULTIPLY BY COMPOSITE COEFFICIENT $\beta_U$ (=1−$\alpha_U$)
   AREA $E_D$: MULTIPLY BY COMPOSITE COEFFICIENT $\beta_D$ (=1−$\alpha_D$)
FIG. 4
S11 CALCULATE CURRENT VEHICLE POSITION INFORMATION
S12 CALCULATE AREA $E_1$ SURROUNDING VEHICLE POSITION
S13 PRODUCE COMPOSITE DISPLAY OF REAL IMAGE WITH MAP IMAGE DISPLAYED AS BACKGROUND
S14 DISPLAY CURRENT VEHICLE POSITION MARK
① MAP IMAGE DATA
   AREA $E_0$: MULTIPLY BY COMPOSITE COEFFICIENT $\alpha_0$ (=1)
   AREA $E_1$: MULTIPLY BY COMPOSITE COEFFICIENT $\alpha_1$ (=0.5)
② REAL IMAGE DATA
   AREA $E_0$: MULTIPLY BY COMPOSITE COEFFICIENT $\beta_0$ (=1−$\alpha_0$)
   AREA $E_1$: MULTIPLY BY COMPOSITE COEFFICIENT $\beta_1$ (=1−$\alpha_1$)
FIG. 2
S1 CALCULATE CURRENT VEHICLE POSITION INFORMATION
S2 CALCULATE AREA $E_1$ SURROUNDING VEHICLE POSITION
S3 PRODUCE COMPOSITE DISPLAY OF REAL IMAGE WITH MAP IMAGE DISPLAYED AS BACKGROUND
S4 DISPLAY CURRENT VEHICLE POSITION MARK
① MAP IMAGE DATA
   AREA $E_0$: MULTIPLY BY COMPOSITE COEFFICIENT $\alpha_0$ (=1)
   AREA $E_1$: MULTIPLY BY COMPOSITE COEFFICIENT $\alpha_1$ (=0)
② REAL IMAGE DATA
   AREA $E_0$: MULTIPLY BY COMPOSITE COEFFICIENT $\beta_0$ (=1−$\alpha_0$)
   AREA $E_1$: MULTIPLY BY COMPOSITE COEFFICIENT $\beta_1$ (=1−$\alpha_1$)

What is claimed is:

1. An image display apparatus comprising:
a display screen; and
a display control unit which displays a map image and a real image, which have the same scale and show the same area, on the display screen on the basis of map data and real image data, wherein:
the display control unit displays one of the map image and the real image as a background,
combines the map image and the real image in a predetermined region so that the other is seen through the one in at least a part of the predetermined region, and
displays the combined image in the predetermined region.

2. The apparatus according to claim 1, further comprising a composite degree setting unit which sets a composite degree of the map image and the real image, wherein:
the display control unit combines the map image and the real image on the basis of the composite degree.

3. The apparatus according t claim 1, wherein the display control unit combines the map image and the real image so that luminance value of the combined image increases as approaching to a boundary of the predetermined region.

4. A navigation apparatus for providing a user with information required reaching a destination to guide the user to the destination, the navigation apparatus comprising:
a display screen; and
an image display device including:
a display screen; and
a display control unit which displays a map image and a real image, which have the same scale and show the same area, on the display screen on the basis of map data and real image data, wherein:
the display control unit displays one of the map image and the real image as a background;
the display control unit combines the map image and the real image in a predetermined region so that the other is seen through the one in at least a part of the predetermined region; and the display control unit displays the combined image in the predetermined region.

5. The apparatus according to claim 4, wherein:

the image display device further includes a composite degree setting unit which sets a composite degree of the map image and the real image; and the display control unit combines the map image and the real image on the basis of the composite degree.

6. The apparatus according to claim 4, wherein the display control unit combines the map image and the real image so that luminance value of the combined image increases as approaching to a boundary of the predetermined region.

7. The apparatus according to claim 4, wherein the predetermined region is one of:

a peripheral region of a current position of a vehicle obtained on the basis of current position information;

a peripheral region of a predetermined facility obtained on the basis of predetermined facility position information; and a peripheral region of a predetermined position obtained on the basis of predetermined position information specified by the user.

8. The apparatus according to claim 4, wherein the predetermined region is one of an upper portion of the display screen and a lower portion of the display screen.

9. The apparatus according to claim 4, wherein the predetermined region is a peripheral region of a route for the destination obtained on the basis of route information.

* * * * *